(12) United States Patent
Kaup

(10) Patent No.: US 6,272,254 B1
(45) Date of Patent: Aug. 7, 2001

(54) METHOD FOR ENCODING AND DECODING OF A DIGITALIZED IMAGE AND ARRANGEMENT FOR IMPLEMENTION OF THE METHOD

(75) Inventor: Andre Kaup, Höhenkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/171,514

(22) PCT Filed: Oct. 14, 1997

(86) PCT No.: PCT/DE97/02350

§ 371 Date: Oct. 20, 1998

§ 102(e) Date: Oct. 20, 1998

(87) PCT Pub. No.: WO98/24239

PCT Pub. Date: Jun. 4, 1998

(30) Foreign Application Priority Data

Nov. 26, 1997 (DE) .............................. 196 48 963

(51) Int. Cl.⁷ ..................................... G06K 9/36
(52) U.S. Cl. ................ 382/236; 382/238; 382/232; 382/242
(58) Field of Search ................... 382/236, 238, 382/232, 242, 107

(56) References Cited

U.S. PATENT DOCUMENTS 4,890,160 * 12/1989 Thomas .......................... 348/429.1
5,692,063 * 11/1997 Lee et al. ........................ 382/107
5,845,012 * 12/1998 Jung .................................. 382/242

FOREIGN PATENT DOCUMENTS 0 525 310    3/1993  (EP) .............................. G06F/15/70
WO 97/13372  10/1997 (WO) .............................. H04N/7/26

OTHER PUBLICATIONS

IEEE Transactions On Image Processing, vol. 4, No. 1, Jan. 1995—Wu et al.

MPEG4 Video Verification Model MPEG96/N1380 Chicago, Oct. 1996, International Organisation For Standardisation.

Signal Processing V: Theories and Applications—Torres, Publication date Sep. 18, 1990—Yu et al p. 901–904.

Transform Coding of Arbitrarily–Shapd Image Segments—Chang et al XP 000607524.

* cited by examiner

Primary Examiner—Jose L. Couso
Assistant Examiner—Anh Hong Do
(74) Attorney, Agent, or Firm—Schiff Hardin & Waite

(57) ABSTRACT

In a method for image encoding of a digitalized image, in a method for image decoding of a digitalized image, and in an arrangement for the implementation of the methods, both in motion estimating as well as in motion compensation, a padding is implemented only for picture elements of an object edge image block that are located within an image object. No padding is implemented for other picture elements located outside the image object.

12 Claims, 4 Drawing Sheets

METHOD FOR ENCODING AND DECODING OF A DIGITALIZED IMAGE AND ARRANGEMENT FOR IMPLEMENTION OF THE METHOD

BACKGROUND OF THE INVENTION

New moving image compression methods are based on a resolution of the image content into what are referred to as image objects with arbitrary edging. The individual image objects are separately encoded in various video object planes (what are referred to as VOPs), and are transmitted and decoded in the receiver and again "combined". Traditional image compression methods are based on a resolution of the entire image into quadratic image blocks. This principle can also be accepted in the object-based methods. However, problems arise in the encoding of the image blocks that are located at the edge of the respective image object since the object edging usually does not coincide with the block edges. What is referred to as a motion-compensated prediction of these edge blocks is especially critical in this context.

There are a number of different search strategies for the motion estimation and the motion compensation. What is referred to as the "block matching method" is usually utilized for block-based image compression methods. It is based thereon that the image block to be encoded is compared with same-sized blocks of a reference image. One of the reference image blocks is located at the same position as the image block to be encoded; the other reference image blocks are topically shifted compared to it. Given a large search area in the horizontal and vertical directions, a great number of search positions thus derive, so that correspondingly, many block comparison ("matchings") must also be implemented given what is referred to as a complete search ("full search"). The sum of the absolute differences of the encoding information that is respectively allocated to each picture element is usually employed as a criterion for the match quality between the block to be respectively encoded and the reference block.

What is to be understood by encoding information in the framework of this document is, for example, the luminance information with which a luminance value that a picture element exhibits is respectively described or, too, a color information, i.e. the chrominance value allocated to the respective picture element.

It is known in the motion compensation from the publication ISO/IEC JTC1/SC29/WG11, Coding of Moving Pictures and Associated Audion Information, MPEG 96/N1380. MPEG5 Video Verification Model, Version 4.0, pages 31 through 35, Chicago, October 1996, to implement what is referred to as a padding in the framework of the motion compensation, whereby the padding given the method from the ISO publication occurs over the entire area of the reference image RB that does not belong to the image object BO.

The block-based image encoding method MPEG 2 is known from the publication J. De Lameillieure and R. Sch äfer, MPEG-2-Bildcodierung für das digitale Fernsehen, Fernsehund Kino-Technik, Volume 48, No. 3, pp. 99–107, 1994. The publication Xiaolin Wu and Yonggang Fang, A Segmentation-Based Predictive Multiresolution Image Coder, IEEE Transactions on Image Processing, Vol. 4, No. 1, pp. 34–46, January 1995, discloses a method for segmentation of image objects from an image.

SUMMARY OF THE INVENTION

The invention is based on the problem of specifying a method for the image encoding, a method for the image decoding, as well as an arrangement for the implementation of the methods with which the image encoding or the image decoding is possible with a computing time requirement that is reduced compared to known methods.

The problem is solved by the method for image encoding of a digitalized image having an arbitrary number of picture elements wherein the image is provided with at least one image object that comprises an arbitrary number of picture elements. The image is also provided with image blocks. A motion compensation is implemented for the image blocks. A path is implemented in the motion compensation of an object edge image block that comprises at least one object edge of the image object. The padding is only implemented with respect to picture elements that are located within the image object.

Also, according to a method of the invention for an image encoding of a digitalized image having an arbitrary number of picture elements, at least one image object that comprises an arbitrary number of picture elements is identified in the image. The image is divided into image blocks. A motion estimation is implemented for the image blocks. A padding is implemented in the motion estimation of an object edge image block that comprises at least one object edge of the image block. The padding is only implemented with respect to picture elements that are located within the image object.

Also according to the invention, an apparatus is provided for image encoding of a digitalized image having an arbitrary number of picture elements. A processor unit is configured such that: at least one image object that comprises an arbitrary number of picture elements is identified in the image; the image is divided into image blocks; a motion estimation is implemented for the image blocks; a padding is implemented in a motion estimation of an object edge image block that comprises at least one object edge of the image block; and the padding is only implemented with respect to picture elements that are located within the image object.

Also according to the invention, an apparatus is provided for image decoding of a digitalized image having an arbitrary number of picture elements wherein a processor unit is configured such that: the image comprises at least one image object that comprises an arbitrary number of picture elements; the image comprises image blocks; a motion compensation is implemented for the image block; a padding is implemented in the motion compensation of an object edge image block that has at least one object edge of the image object; and the padding is only implemented with respect to picture elements that are located within the image object.

At least one image object is determined in the image given the method for image encoding. Further, the image is demarcated into image blocks and a motion estimation is implemented for the image blocks. A padding is implemented in the motion estimation of an image block that comprises at least one object edge of the image object, whereby the padding is merely implemented with respect to picture elements that are located within the image object.

In the method for image decoding, a padding is likewise implemented only with respect to picture elements that are located within the image object for motion compensation of an image block that exhibits at least one object edge of an image object.

In the arrangement for the implementation of at least one of the methods, first, an image store for storing the digital image data is provided, as is a processor unit for the implementation of the individual methods steps of either the method for image encoding or, too, the method for image decoding.

Both methods as well as the arrangement exhibit the considerable advantage that a considerable saving in computing time is achieved in the implementation of the image encoding or, of the image decoding. This is to be attributed thereto that the picture element supplementation required for the motion estimating or, for the motion compensation is no longer carried out independently of a contour information at a fixed block grid but as mush image information is respectively supplemented as required taking the momentary motion vector and the known object contour into consideration.

It is advantageous in the method for image encoding to implement the padding in the framework of the motion compensation for the internal reconstruction of the image in the same, above-described way.

A further saving of computing time in the image encoding is achieved with this procedure since the advantageous procedure is also implemented in the internal reconstruction.

Further, it is advantageous in the method for image encoding to store values of coding information of previously padded picture elements and to re-employ further image blocks in the motion estimating. A further saving of computing time is achieved in this way since a padding of picture elements that were already "padded" in preceding motion estimates and, thus, a "double" implementation of the padding is avoided.

BRIEF DESCRIPTION OF THE DRAWINGS

Exemplary embodiments of the invention are shown in the Figures, these being explained in greater detail below.

Shown are.

DESCRIPTION OF THE PREFERRED EMBODIMENTS

Figures 1, 2A:
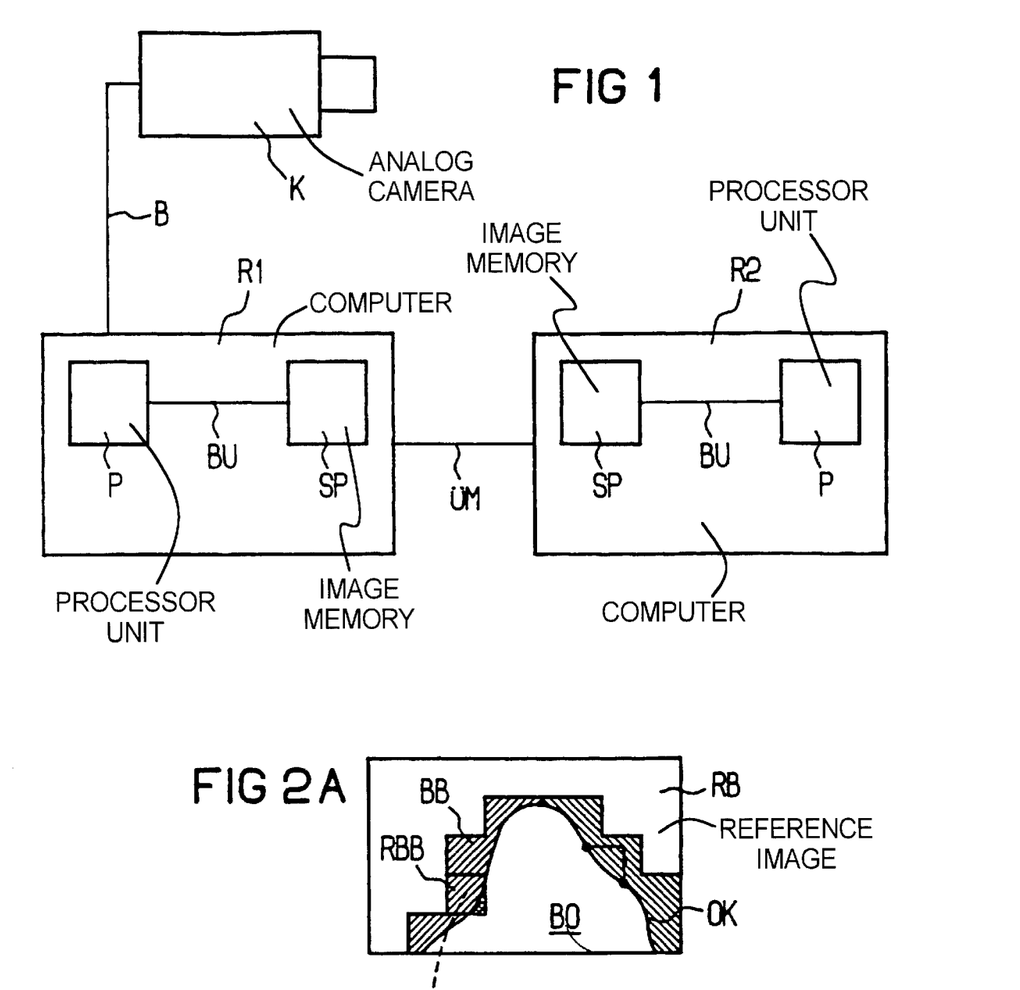
FIG. 1 is a computer arrangement with two computers and a camera.
FIGS. 2a and 2b show an image to be encoded (FIG. 2b) and a reference image (FIG. 2a) on the basis whereof the principle of the method for image decoding is presented.

FIG. 1 shows a camera with which pictures are taken. The camera K can, for example, by an arbitrary analog camera K that registers images of a scene and either digitizes these images in the camera K or, also, transmits them to a computer R1, analog, fashion in which the digitalized images are then either processed or the analog images are converted into digitalized images and the digitalized images are processed.

The camera K, however, can also be a digital camera K with which digitalized images are directly registered and supplied to the computer R1 for further-processing.

The computer R, which, for example, can also be designed as an independent arrangement that implements the method steps described below, for example as an independent computer card that is installed in a computer.

The computer R1 comprises a processor unit P with which the below-described method steps of motion estimating or motion compensation as well as potentially further method steps, for example for image encoding, are implemented. For example, the processor unit P is coupled via a bus BU to a memory SP in which the image data are stored.

The method for motion estimating or motion compensation can be advantageously utilized both for image encoding as well as for image decoding.

It is provided to undertake the image encoding in the computer R1 and, after transmission of the compressed image data via a transmission medium ÜM to a further computer R2, to implement the image decoding in the further computer R2. The further computer R2, for example, comprises the same structure as the first computer R1, i.e. the memory that is coupled via the bus BU to the processor unit P.

New moving image compression methods, for example the methods according to the future MPEG4 standard, are based on a resolution of the image content of the digitalized image B, which comprises an arbitrary number of picture elements BP, into an arbitrary number of image objects BO.

FIG. 2a shows a reference image that shows an image object BO with an object edge OK and image blocks BB. The reference image RB is already decoded in the image decoding and is present in the decoded condition in the image memory SP of a computer R1, R2.

Figure 2B:
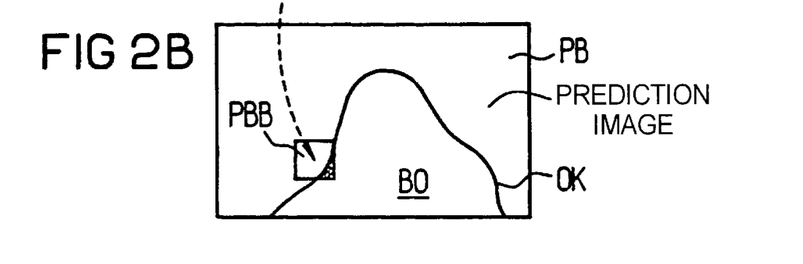

The image PB to be predicated is now reconstructed in the framework of the image decoding.

For image decoding, a motion compensation is implemented wherein a reconstruction of the image PB to be predicated, particularly of the image block PBB to be predicted, occurs proceeding from contour information present in the image region about image objects BO contained in the image or, respectively, image block BB and the motion vector that was allocated to the image block PBB to be predicated.

What is to be understood by padding in the framework of this application are the most varied methods for supplementing coding information that are allocated to individual picture elements BP of the image B.

What is to be understood in this context by coding information is, for example, luminance information (brightness information) or chrominance information (color information) that is respectively allocated to a picture element.

For simpler presentation, the method described below is described on the basis of an image block BB that, for example, comprises 8×8. Without limitation of the universal validity, however, it can also be applied without further ado to macro blocks that are usually composed of 4 or, also, of 16 image blocks. Any other desired elementary units of the respectively underlying encoding method can also be taken into consideration in the framework of the method, for example rectangles or triangles, etc., of an arbitrary shape and size. What is thus to be understood by an image block is an elementary unit of arbitrary shape and size into which the image b is divided and for which the respective encoding method occurs.

A padding can occur in a great variety of ways, for example according to one of the following procedures:

a) a prescribable value of the coding information is allocated to the picture elements to be padded.

b) A value of the coding information that derives from the coding information of picture elements of the image block for which no padding occurs is allocated to the picture elements to be padded.

c) A value of a coding information that derives from an average of the coding information of picture elements of the image block for which no padding occurs is allocated to the picture elements to be padded.

d) A value of a coding information that derives from a low-pass supplementation of the coding information of the image block for which no padding occurs is allocated to the picture elements to be padded.

e) A value of the coding information that derives from a prescribable conformal imaging of the coding information of picture elements of the image block for which no padding occurs is allocated to the picture elements to be padded.

f) A value of the coding information that derives after what is referred to as a repetitive padding described in the ISO publication is allocated to the picture elements to be padded.

The contour information of the image object BO for the image block PBB to be respectively predicted is contained in the motion compensation for the image PBB to be predicted. Which picture elements form the object edge OK, which picture elements BP are located within the image object BO and which picture elements BP are located outside the image object BO are thus known for the image block PBB to be predicted.

Proceeding from a reference image block RBB whose coding information was already exploited in the decoding of the reference image RB, the image information is also known. Further, a motion vector BV is allocated to the respective reference image block RBB with which the topical shift of the reference image block by which the reference image block RBB is shifted in order to yield the image block PBB to be predicated is described.

In the method for the image block PBB to be predicted, a padding is respectively implemented in the motion compensation, whereby the padding is only applied to those picture elements BP of the image block PBB to be predicated that have an object edge OK that are located within the image object BO of the image block PBB to be predicted. No padding occurs for picture elements BP that are not located within the image object BO in the image block PBB to be predicted.

Figure 3:
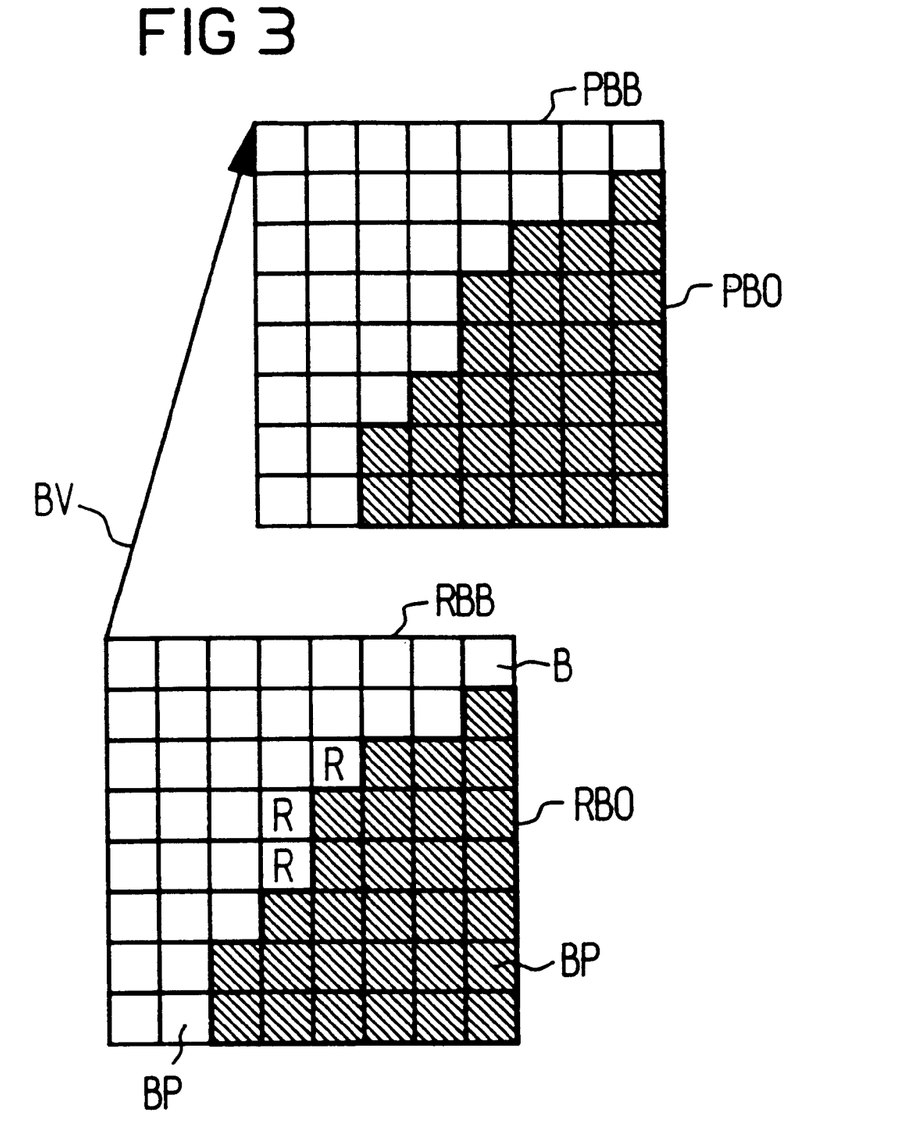
FIG. 3 shows an object edge image block in an image to be decoded as well as the reference image block in a reference image.

This procedure is shown in FIG. 3, which shows a reference image block RBB, the image block PBB to be predicted as well as the motion vector BV that is allocated to the reference image block RBB.

The letter R marks those picture elements for which a padding is implemented. The picture elements to be padded derive, for example, in that the object edge OK in the image block PBB to be predicated is superimposed on the object edge OK of the corresponding reference image block RBB and only those picture elements that lie outside the reference object RBO and within the image object PBO to be predicted experience a picture element supplementation, i.e. padding.

After this, a motion-compensated prediction for all picture elements lying within the image object BO can be determined via the motion vector BV by shifting the picture elements along, for example, the motion trajectory. No prediction is determined for the picture elements BP lying outside the image object BO.

In a version of the method, it is likewise provided that the shift of the picture elements BP established within the object edge OK of the reference image block RBB is implemented first, and the picture element supplementation up to the object edge OK of the image block PBB to be predicted occurs subsequently. In this case, however, the picture elements BP that are already supplemented are no longer available for a prediction of another object edge image block and would have to be re-determined.

Figure 4:
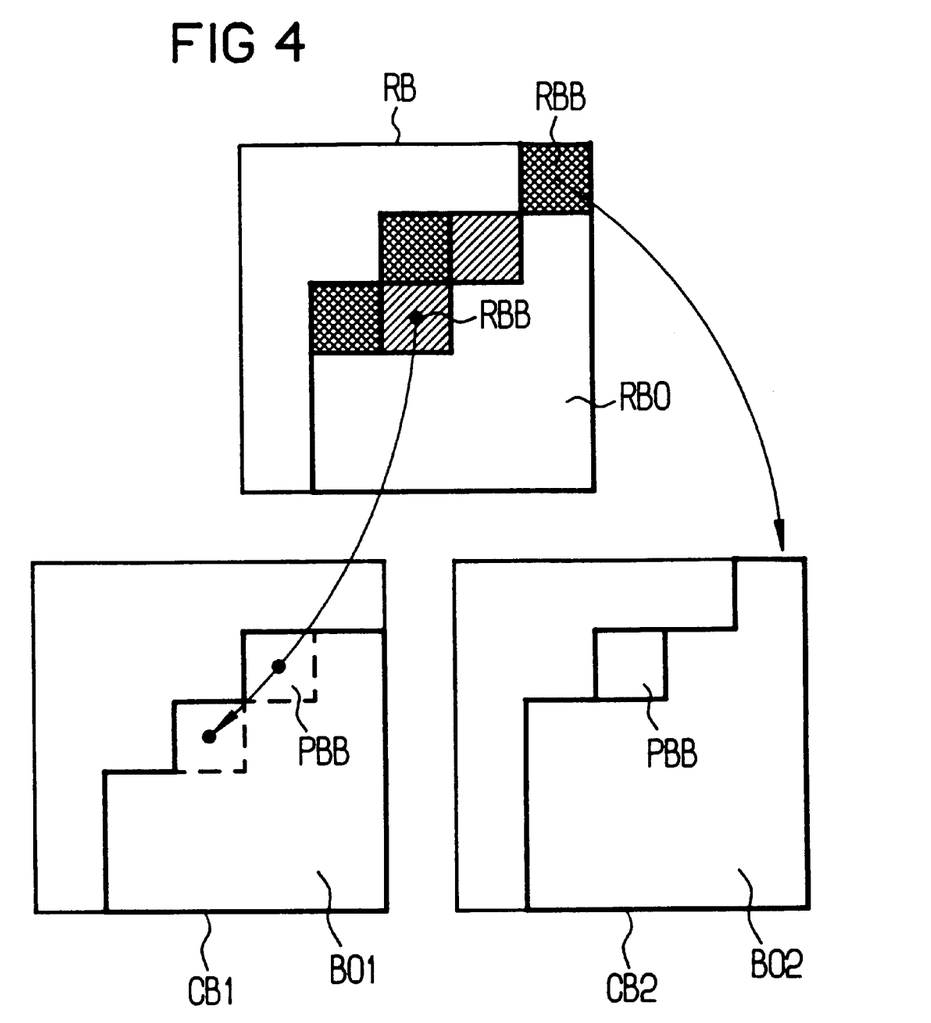
FIG. 4 shows two images to be encoded as well as a reference image for presenting the method for image encoding.

FIG. 4 shows a reference image RB and two images CB1, CB2 to be encoded for which a motion estimating is respectively implemented.

The reference image object RBO, a first image object BO1 and a second image object BO2 are shown.

A motion estimating in the framework of the image encoding is implemented for object edge image blocks of the first image object BO1 and of the second image object BO2.

This again occurs in such a way that a padding is implemented in the framework of the motion estimating, namely only for the regions of the object edge image block OBB that are located within the first image object BO1 or within the second image object BO2.

No padding and, thus, no prediction, either, is implemented for the picture elements BP located outside the respective image object BO1, BO2.

Figure 5A:
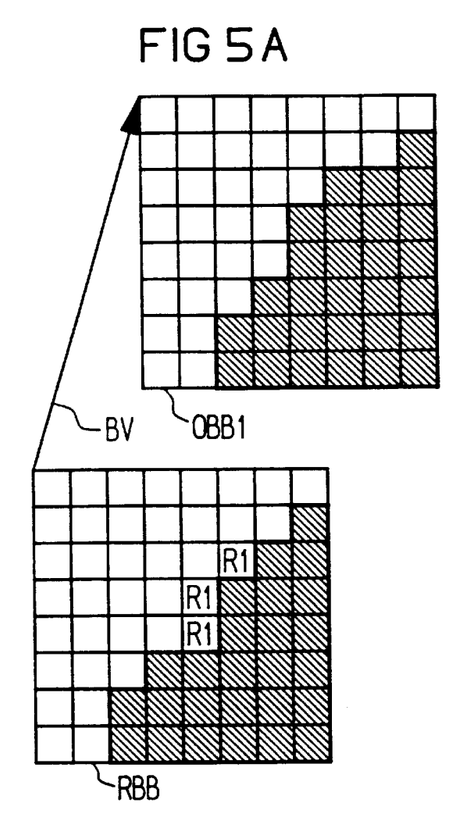
FIGS. 5a and 5b illustrate two image blocks to be encoded with a respective reference image block from a reference image.
Figure 5B:
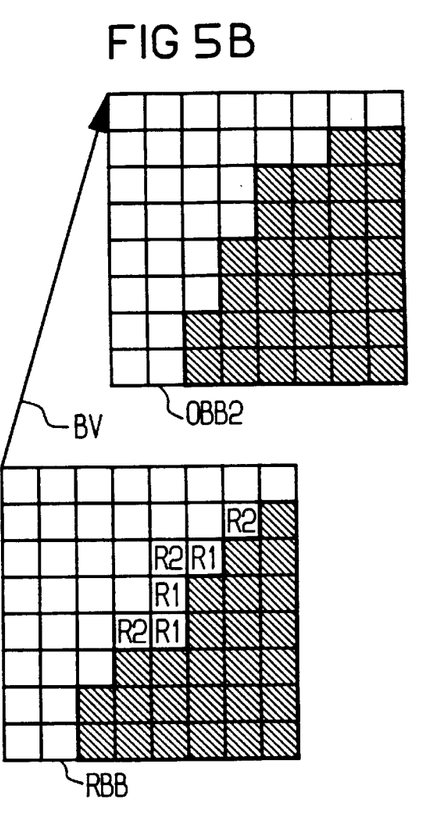

This principle is respectively shown in FIG. 5a or FIG. 5b for a first object edge image block OBB1 and a second object edge image block OBB2. Further, the reference image block RBB with the motion vector BV allocated to the reference image block is also respectively shown in FIGS. 5a and 5b.

The picture elements for which a padding is implemented are referenced R1 in the reference image block RBB in the motion estimating for the first object edge image block OBB1. R1 in FIG. 5b, first, respectively shows a picture element from the padding for the the first object edge image block OBB1 and R2 respectively references a picture element for which a padding was implemented in the framework of the motion estimating for the second object edge image block OBB2.

In a development of the method, it is provided in the framework of the motion estimating to respectively store the values of the padded picture elements after the motion estimating for an object edge image block OBB, and to re-employ them in a further motion estimating for a further object edge image block and to then in fact additionally respectively supplement only the picture elements that still need to be padded.

A considerable, further saving of computing time in the motion estimating is achieved in this way.

Further, it is also provided in a development of the invention to likewise implement the above-described method for image decoding, i.e. motion compensation, in the motion compensation required given image encoding in the framework of an internal image reconstruction.

Although various minor changes and modifications might be proposed by those skilled in the art, it will be understood that my wish is to include within the claims of the patent warranted hereon all such changes and modifications as reasonably come within my contribution to the art.

The following publication [sic] was cited in the framework of this document:

[1] ISO/IEC JTC1/SC29/WG11, Coding of moving pictures and associated audion [sic] information, MPEG 96/N1380. MPEG5 Video Verification Model, Version 4.0, pages 31 through 35, Chicago, October 1996.

[2] J. De Lameillieure and R. Schäfer, MPEG-2-Bildcodierung für das digitale Fernsehen, Fernseh- und Kino-Technik, Volume 48, No. 3, pp. 99–107, 1994.

[3] Xiaolin Wu and Yonggang Fang, A Segmentation-Based Predictive Multiresolution Image Coder, IEEE Tranasactions on Image Processing, Vol. 4, No. 1, pp. 34–46, January 1995.

What is claimed is:

1. A method for image encoding of a digitalized image having an arbitrary number of picture elements, comprising the steps of:

identifying in the image at least one image object that comprises an arbitrary number of picture elements;

dividing the image into image blocks;

implementing a motion estimation for the image blocks;

implementing a padding in the motion estimation of an object edge image block that comprises at least one object edge of the image object; and only implementing the padding with respect to picture elements that are located within the image object.

2. The method according to claim 1 wherein:

a motion compensation of the image for which a motion estimation was implemented occurs for internal reconstruction of the image;

a padding is implemented in the motion compensation of the object edge image block that comprises at least one object edge of the image object; and the padding is only implemented with respect to picture elements that are located within the image object.

3. The method according to claim 1 wherein:

coding information of padded picture elements is stored; and the coding information is re-employed in the motion estimation of further image blocks.

4. The method according to claim 1 wherein the padding occurs according to one of the following procedures:

a prescribable value of a coding information is allocated to the picture elements to be padded;

a value of a coding information that derives from the coding information of picture elements of the image block for which no padding occurs is allocated to the picture elements to be padded;

a value of a coding information that derives from an average of the coding information of picture elements of the image block for which no padding occurs is allocated to the picture elements to be padded;

a value of a coding information that derives from a low-pass supplementation of the coding information of the image block for which no padding occurs is allocated to the picture elements to be padded; or a value of the coding information that derives after a repetitive padding is allocated to the picture elements to be padded.

5. A method for image decoding of a digitalized image having an arbitrary number of picture elements, comprising the steps of:

providing the image with at least one image object that comprises an arbitrary number of picture elements;

providing the image with image blocks;

implementing a motion compensation for the image blocks;

implementing a padding in the motion compensation of an object edge image block that comprises at least one object edge of the image object; and only implementing the padding with respect to picture elements that are located within the image object.

6. The method according to claim 5 wherein the padding occurs according to one of the following procedures:

a prescribable value of a coding information is allocated to the picture elements to be padded;

a value of a coding information that derives from the coding information of picture elements of the image block for which no padding occurs is allocated to the picture elements to be padded;

a value of a coding information that derives from an average of the coding information of picture elements of the image block for which no padding occurs is allocated to the picture elements to be padded;

a value of a coding information that derives from a low-pass supplementation of the coding information of the image block for which no padding occurs is allocated to the picture elements to be padded; or a value of the coding information that derives after a repetitive padding is allocated to the picture elements to be padded.

7. An apparatus for image encoding of a digitalized image having an arbitrary number of picture elements, comprising:

a processor unit that is configured such that at least one image object that comprises an arbitrary number of picture elements is identified in the image;

the image is divided into image blocks;

a motion estimation is implemented for the image blocks;

a padding is implemented in the motion estimation of an object edge image block that comprises at least one object edge of the image object; and the padding is only implemented with respect to picture elements that are located within the image object.

8. The apparatus according to claim 7 wherein the processor unit is configured such that a motion compensation of the image for which a motion estimation was implemented occurs for the internal reconstruction of the image;

a padding is implemented in the motion compensation of the object edge image block that comprises at least one object edge of the image object; and the padding is only implemented with respect to picture elements that are located within the image object.

9. The apparatus according to claim 7, whereby the processor unit is configured such that coding information of padded picture elements is stored; and the coding information is re-employed in the motion estimation of further image blocks.

10. The apparatus according to claim 7 wherein the processor unit is configured such that the padding occurs according to one of the following procedures:

a prescribable value of a coding information is allocated to the picture elements to be padded;

a value of a coding information that derives from the coding information of picture elements of the image block for which no padding occurs is allocated to the picture elements to be padded;

a value of a coding information that derives from an average of the coding information of picture elements of the image block for which no padding occurs is allocated to the picture elements to be padded;

a value of a coding information that derives from a low-pass supplementation of the coding information of the image block for which no padding occurs is allocated to the picture elements to be padded; or a value of the coding information that derives after a repetitive padding is allocated to the picture elements to be padded.

11. An apparatus for image decoding of a digitalized image having an arbitrary number of picture elements, comprising:

a processor unit that is configured such that the image comprises at least one image object that comprises an arbitrary number of picture elements;

the image comprises image blocks;

a motion compensation is implemented for the image blocks;

a padding is implemented in the motion compensation of an object edge image block that comprises at least one object edge of the image object; and the padding is only implemented with respect to picture elements that are located within the image object.

12. The apparatus according to claim 11 wherein the processor unit is configured such that the padding occurs according to one of the following procedures:

a prescribable value of a coding information is allocated to the picture elements to be padded;

a value of a coding information that derives from the coding information of picture elements of the image block for which no padding occurs is allocated to the picture elements to be padded;

a value of a coding information that derives from an average of the coding information of picture elements of the image block for which no padding occurs is allocated to the picture elements to be padded;

a value of a coding information that derives from a low-pass supplementation of the coding information of the image block for which no padding occurs is allocated to the picture elements to be padded; or a value of the coding information that derives after a repetitive padding is allocated to the picture elements to be padded.

* * * * *

UNITED STATES PATENT AND TRADEMARK OFFICE
CERTIFICATE OF CORRECTION

PATENT NO. : 6,272,254 B1
DATED : August 7, 2001
INVENTOR(S) : Andre Kaup

It is certified that error appears in the above-identified patent and that said Letters Patent is hereby corrected as shown below:

Title page,
In the Title the word "IMPLEMENTION" should read -- IMPLEMENTATION --.

Signed and Sealed this

Fifteenth Day of January, 2002

Attest:

JAMES E. ROGAN
Attesting Officer	Director of the United States Patent and Trademark Office